United States Patent [19]
Green

[11] Patent Number: 6,101,989
[45] Date of Patent: *Aug. 15, 2000

[54] LOW EMISSION POWER PLANT AND METHOD OF MAKING SAME

[75] Inventor: Edward Green, Bakersfield, Calif.

[73] Assignee: Clean Cam Technolog Systems, Bakersfield, Calif.

[*] Notice: This patent is subject to a terminal disclaimer.

[21] Appl. No.: 09/140,356

[22] Filed: Aug. 26, 1998

Related U.S. Application Data

[63] Continuation-in-part of application No. 09/030,659, Feb. 25, 1998, which is a continuation of application No. 08/721,232, Sep. 26, 1996, Pat. No. 5,746,163.

[51] Int. Cl.$^7$ ................................................ F02B 75/02
[52] U.S. Cl. ........................ 123/65 VC; 123/65 BA; 123/568.14
[58] Field of Search .................. 123/65 VC, 65 R, 123/65 W, 65 P, 65 BA, 68, 73 C, 568.14, 276

[56] References Cited

U.S. PATENT DOCUMENTS

| | | | |
|---|---|---|---|
| 2,205,493 | 6/1940 | Saurer | 123/276 |
| 2,991,616 | 7/1961 | Miller | 60/13 |
| 3,020,898 | 2/1962 | Hartmann | 124/276 |
| 4,018,194 | 4/1977 | Mitchell et al. | 123/276 |
| 4,176,628 | 12/1979 | Kanai et al. | 123/276 |
| 4,207,843 | 6/1980 | List et al. | 123/276 |
| 4,676,208 | 6/1987 | Moser et al. | 123/276 |
| 5,746,163 | 5/1998 | Green | 123/65 VC |
| 5,899,178 | 5/1999 | Green | 123/65 VC |

*Primary Examiner*—Henry C. Yuen
*Assistant Examiner*—Brian Hairston
*Attorney, Agent, or Firm*—James E. Brunton, Esq.

[57] ABSTRACT

A low emission power generating apparatus which comprises a modified two-stroke diesel engine component and a modified turbocharger component which has a relatively low aspect ratio. The diesel engine component is a modification of a conventional two-stroke diesel engine design and includes an exhaust valve cam of unique design that has a cam profile which results in a later than-normal exhaust valve opening and an earlier-than-normal valve closing so that the time during which the exhaust valve remains open is shorter than normal, thereby causing a substantially greater volume of residual gases to remain in the combustion chamber following the scavenge stroke. This increase in the volume of the residual exhaust gases within the chamber leads to an increase in compression temperature and effectively increases the compression ratio and consequently the compression pressure. Because of the heat absorption capacity of these residual exhaust gases, the exhaust gases remaining in the chamber following the scavenge stroke tend to absorb combustion heat and thereby effectively reduce the peak combustion temperature. This reduction in peak combustion temperature advantageously results in the lower than normal formation of nitrogen oxide (NOx) and, therefore, allows advancement of the injection timing, while still maintaining the NOx emissions coming from the engine lower than those legislatively mandated. Advantageously, the advance in injection timing, which increases NOx emissions, by definition has the effect of also reducing particulate matter emissions. Thus, by increasing the volume of residual exhaust gases within the cylinder, substantial particulate matter emission reductions can be achieved, while at the same time maintaining NOx emissions well below mandated limits. The modified turbocharger component provides an additional charge of oxygen-rich air into the combustion chamber which effectively increases the compression pressure, which, in turn, leads to an earlier start of combustion because of the combustible mixture reaching its auto-ignition temperature at an earlier point in the cycle. This phenomenon leads to more thorough combustion of the fuel and also generally leads to higher exhaust temperatures. Higher exhaust temperatures, in turn, lead to a greater oxidation rate of the soluble organic fraction thus lowering the level of emission from the engine of undesirable particulate matter.

20 Claims, 11 Drawing Sheets

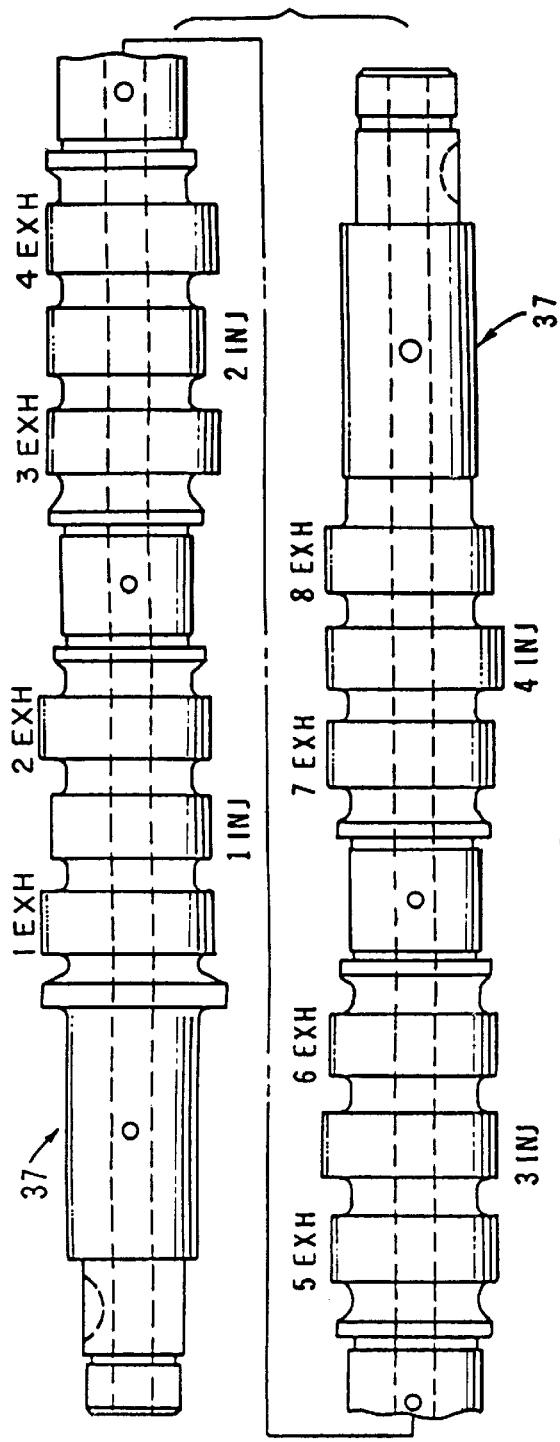
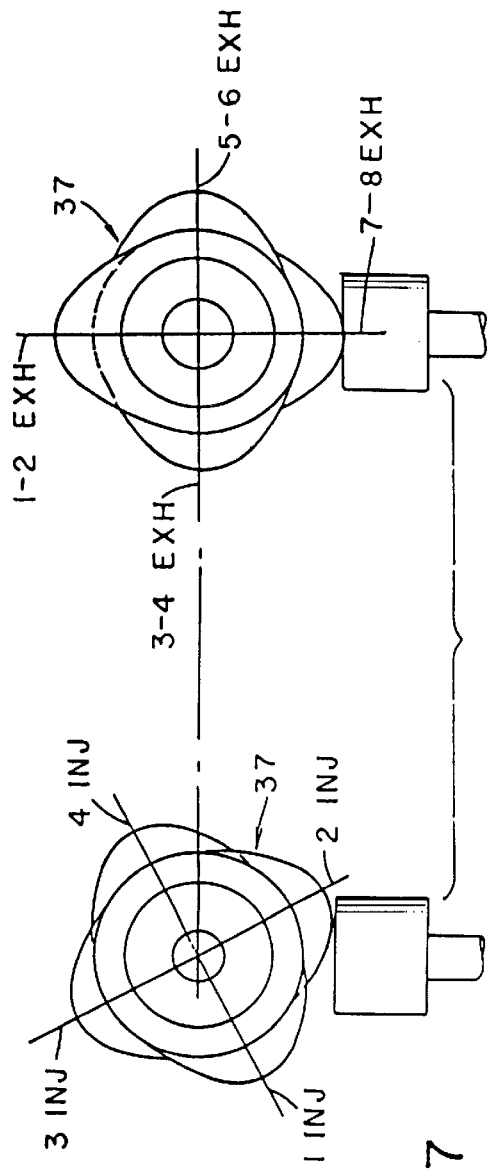
FIG. 6
FIG. 7

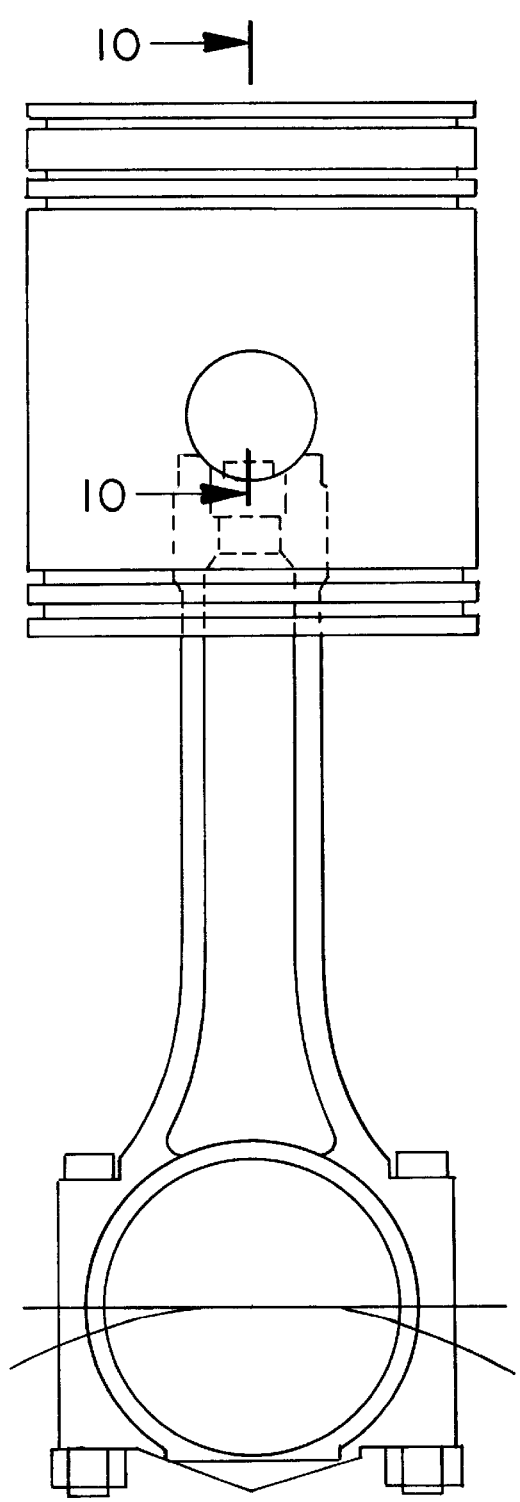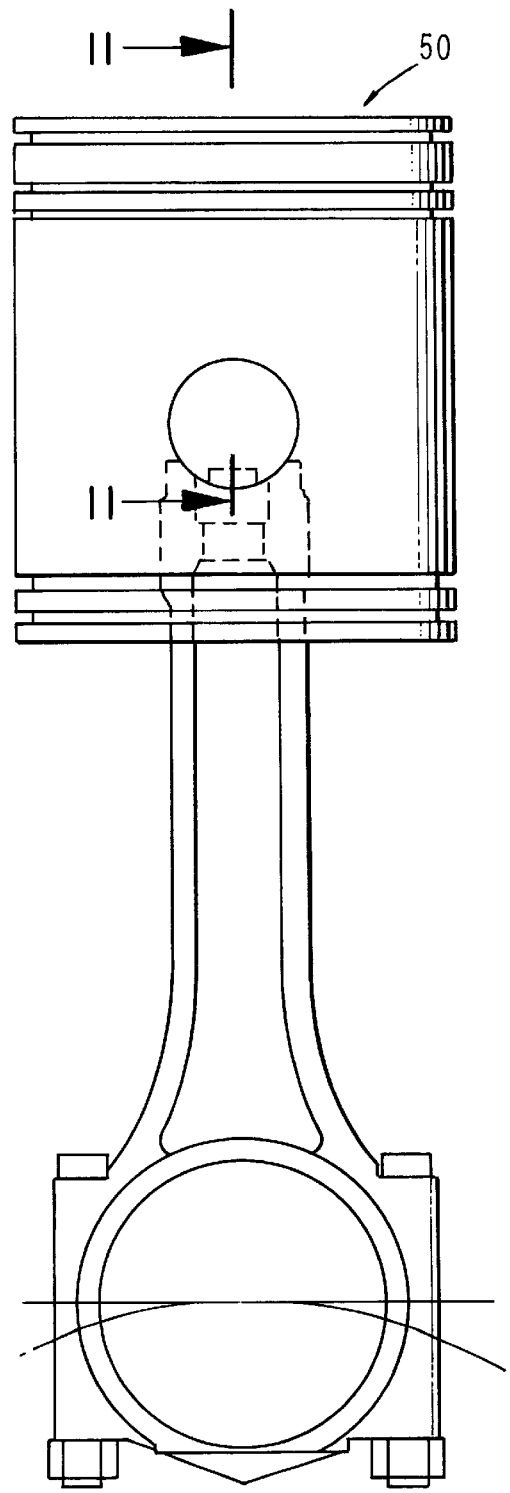
FIG. 8
PRIOR ART
FIG. 9

LOW EMISSION POWER PLANT AND METHOD OF MAKING SAME

This is a Continuation-in-Part of co-pending application Ser. No. 09/030,659 filed on Feb. 25, 1998, which is a Continuation application of application Ser. No. 08/721,232 filed Sep. 26, 1996 and now U.S. Pat. No. 5,746,163.

BACKGROUND OF THE INVENTION

1. Field of the Invention

The present invention relates generally to mechanical power pants. More particularly, the invention concerns a low emission power plant which comprises a modified diesel engine component and a modified turbocharger component which has a relatively low turbocharger aspect ratio. The diesel engine component is a modification of a two-stroke, uniflow-scavenge diesel engine design and includes an exhaust valve cam of unique design that has a cam profile which results in a later-than-normal exhaust valve opening and an earlier-than-normal valve closing so that the time during which the exhaust valve remains open is shorter than normal thereby causing a substantially greater volume of residual gases to remain in the combustion chamber following the scavenge stroke.

2. Discussion of the Prior Art

Mechanical power plants embodying diesel engines are widely used in both on-road and off-road applications. Such power plants have always been popular for use in large trucks. However, such power plants have also been used extensively for off-road applications such as in earth moving equipment, in road graders and in stationary applications in connection with water and oil well drilling and pumping apparatus and many other applications.

Diesel engines are designed to operate on the two-stroke or on the four-stroke principle as are gasoline engines. In the two-stroke engine, intake and exhaust take place during part of the compression. A four-stroke engine requires four piston strokes to complete an operating cycle and thus, during one-half of its operation, the four-cycle engine functions merely as an air pump. The present invention is directed primarily, but not exclusively, to use with two-stroke engines.

While diesel engines are durable, reliable, and economical, the control of emissions from such engines has presented substantial problems. Accordingly, extensive research has been directed toward making the diesel engine burn ever cleaner so as to meet seemingly ever increasing emission control requirements imposed by state and federal legislation. In this regard, substantial experimentation has been in the areas of electrical and electronics monitoring and control. However, the thrust of the present invention is directed to effectively decreasing emissions from diesel engine power plants by mechanical means using, for the most part specially modified, generally commercially available components.

As will be better appreciated from the discussion which follows, emissions from the improved mechanical power plant of the present invention are quite low. For example, the current legislatively mandated levels of hydrocarbon emissions require that hydrocarbon emissions be no greater than 1.3 grams per horsepower-hour (g/bhp-hr.). Testing of the novel apparatus of the present invention by an independent testing agency has shown the hydrocarbon emissions to be on the order of 0.54 g/bhp-hr, which is obviously substantially less than the generally accepted regulatory level. Similarly, the applicable legislatively man-dated limit for particulate emissions is set at 0.1 grams per brake horsepower-hour (g/bhp-hr.). When the apparatus of present invention was appropriately coupled with a catalytic converter of conventional design and was applied to a typical two-stroke engine, testing of the assemblage revealed that particulate emissions were on the order of 0.08 g/bhp-hr,. which is well within the limits imposed by the retrofit standard. Additionally, while the mandated limit for carbon monoxide emissions is 15.5 g/bhp-hr. testing of the apparatus of the present invention shows carbon monoxide emissions from the apparatus to be less than 0.6 g/bhp-hr. Finally, testing of the power plant of the invention has also revealed that during normal operation the NOx emissions from the power source were 10.2 g/bhp-hr, which is comfortably lower than the legislatively mandated level of 10.7 g/bhp-hr.

SUMMARY OF THE INVENTION

As previously mentioned, the thrust of the present invention is directed toward achieving a substantial reduction in harmful exhaust emissions from diesel engines by mechanical rather than electrical or electronic means and, for the most part, involves the use of specially modified conventional components. In this regard, one form of the improved power plant of the present invention comprises a modification of a power plant which is commercially available from the Detroit Diesel Corporation and includes both a specially modified diesel engine component and a specially modified turbocharger component.

By way of brief summary, the invention involves a two prong approach to the effective reduction of harmful exhaust emissions from conventional diesel engines. The first prong of the approach involves the strategic redesign of both the exhaust cam profile of the conventional uniflow-scavenged, two-stroke diesel engine component and of the cylinder liner configuration thereof in a manner to cause an increase in the volume of residual exhaust gases that remain in the cylinder during the compression, combustion and power strokes. This increase in the volume of the residual exhaust gases within the cylinder leads to an increase in compression temperature and effectively increases the compression ratio and consequently the compression pressure. Because of the heat absorption capacity of these residual exhaust gases, the exhaust gases remaining in the cylinder, following the scavenge stroke, tend to absorb combustion heat and thereby effectively reduce the peak combustion temperature. This reduction in peak combustion temperature advantageously results in the lower than normal production of nitrogen oxide (NOx) and, therefore, allows advancement of the injection timing, while still maintaining the NOx emissions coming from the engine lower than those legislatively mandated. Advantageously, the advance in injection timing, which increases NOx emissions will, in accordance with the well understood NOx versus particulate matter tradeoffs, also have the effect of reducing particulate matter emissions. Thus, by increasing the volume of residual exhaust gases within the cylinder, significant particulate matter emission reductions can be achieved, while at the same time maintaining NOx emissions well below acceptable levels.

The second prong of the inventive approach involves modification of the turbocharger component of the apparatus in a manner to provide additional oxygen to the combustion process. The provision of additional oxygen to the heated combustion chamber of the engine accelerates the oxidation of the soluble organic fraction contained within the chamber which is a major component of the undesirable particulate matter emissions. More specifically, the additional charge of oxygen-rich air into the combustion chamber effectively increases the compression pressure, which in turn, leads to an earlier start of combustion because of the combustible mixture reaching its auto ignition temperature at an earlier point in time. This phenomenon leads to more thorough combustion of the fuel and also generally leads to higher exhaust temperatures. Higher exhaust temperatures, in turn, lead to a greater oxidation rate of the soluble organic fraction thus further lowering the level of undesirable particulate matter emission from the engine.

With the foregoing discussion in mind, it is an object of the present invention to provide a mechanical power plant and the method of making the same for use both in on-road and off-road applications, in which the exhaust emissions from the modified diesel engine component of the apparatus are substantially reduced.

Another object of the invention is to provide a mechanical power plant of the aforementioned character which includes a specially modified, conventional two-stroke uniflow-scavenged diesel engine that has a lower than normal exhaust valve lift and a shorter than normal exhaust valve open time, thereby effectively increasing the amount of residual exhaust gases remaining in the combustion chamber following the scavenge stroke.

Another object of the invention is to provide a mechanical power plant as described in the preceding paragraphs which provides for a greater than normal flow of oxygen-rich air into the combustion chamber of the modified diesel engine so as to accomplish more complete and efficient combustion of fuel and, at the same time, accelerate the oxidation of the soluble organic fraction, that is the unburned lubricating oil and fuel fraction formed in the exhaust system and trapped on the particulate emission sampling filter.

Another object of the invention is to provide a unique mechanical power plant in which the nitrogen oxide emissions exhausted from the diesel engine component are effectively maintained at levels below those set by the air quality regulatory agencies.

These and other objects of the invention are achieved by the novel power generating apparatus of the invention, one form of which is more fully described in the paragraphs which follow.

BRIEF DESCRIPTION OF THE DRAWINGS

FIG. 6 is a side-elevational view of one form of modified camshaft usable with the diesel engine component of the power plant of the invention.

FIG. 7 is a diagrammatic view illustrating the operational sequence of the camshaft shown in FIG. 6.

FIG. 8 is a side-elevational view of a prior art piston and connecting rod of the character that was modified to create an alternate form of modified engine of the present invention.

FIG. 9 is a side elevational view of a piston and crankshaft showing the modified piston of one form of the present invention.

DESCRIPTION OF THE INVENTION

Figure 1:
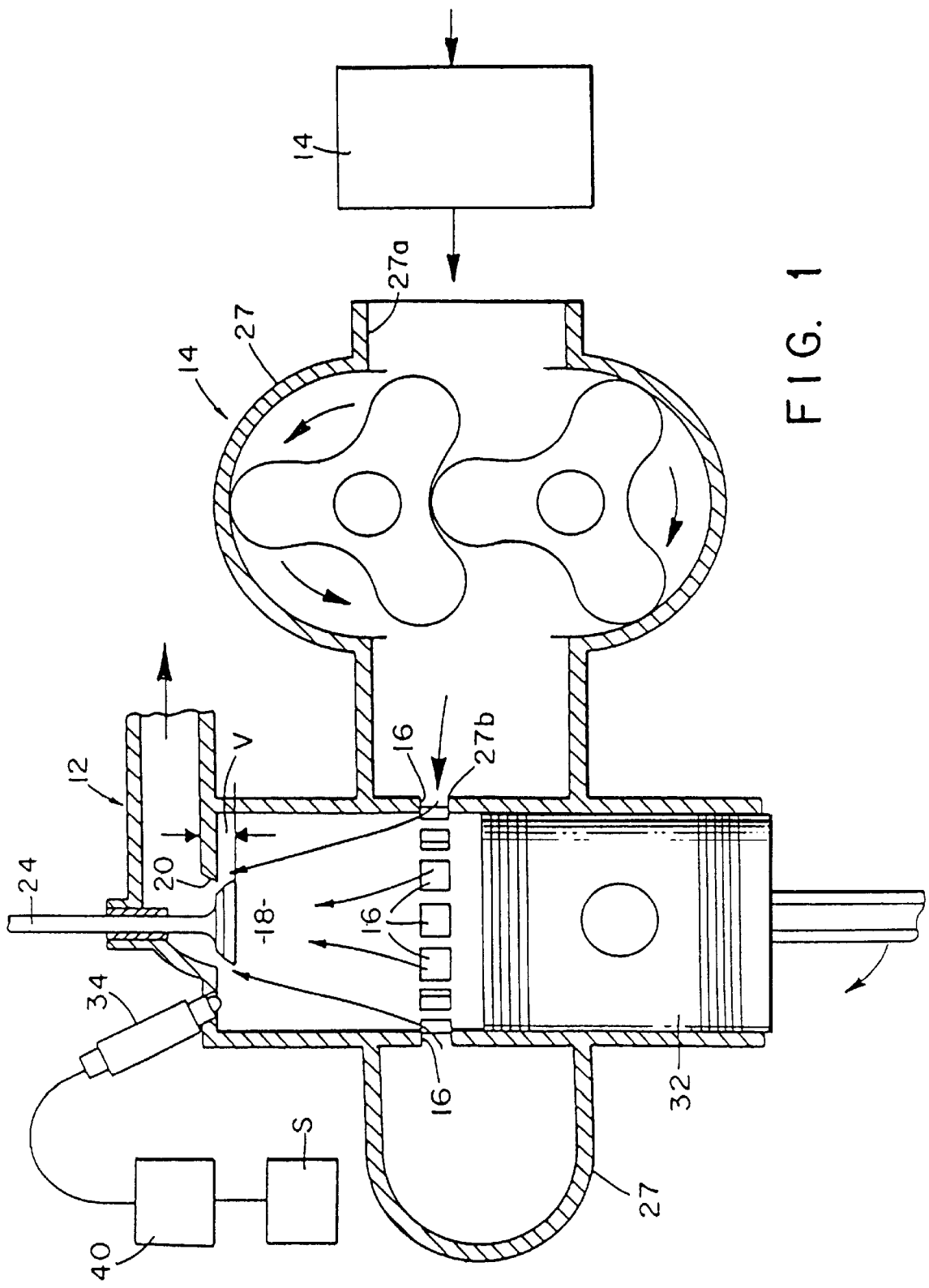
FIG. 1 is a generally diagrammatic view of one form of the power plant or power generating apparatus of the invention illustrating the scavenge stroke of the diesel engine component of the apparatus.

Referring to the drawings and particularly to FIGS. 1, 2A, 2B, and 2C, a mechanical power plant of the general character of the apparatus of the present invention is diagrammatically illustrated. These figures are general in character and do not show all of the various standard components of the power plant, which components are well known to those skilled in the art. As previously mentioned, one form of the power plant of the invention comprises a modification of a commercially available power plant which is also of a character well known to those skilled in the art and includes a turbocharger component and a diesel engine component. In a manner presently to be described, the turbocharger component along with a blower unit functions to controllably deliver air under pressure to the inlet ports of the combustion chamber of the diesel engine component. The diesel engine component of the conventional power plant has a combustion cycle and a scavenge stroke and includes one or more valves for opening and closing exhaust ports provided in the combustion chamber. Additionally, the diesel engine component has a camshaft for operating the valve, a fuel injector for injecting fuel into the combustion chamber, and an injection timing control means which typically comprises a cam profile and a set of shims for timing the injection of fuel into the combustion chamber.

As best seen in FIG. 1, the power plant of the invention basically comprises a modification of a conventional power plant and includes a two-stroke diesel engine component, generally designated by the numeral 12, and a turbocharger means shown in FIG. 1 as comprising a conventional blower 27 and a turbocharger component 14. turbocharger component 14 receives fresh air from atmosphere, raises its pressure and delivers it to the inlet ports 16 of the diesel engine component typically via blower 27. The air under pressure is then delivered to a combustion chamber 18, which is provided with an exhaust port 20. Exhaust port 20 is opened and closed by valve means shown here as comprising a valve member 24. It is to be understood that the engine typically includes more than one valve but, for simplicity of explanation, only one exhaust valve is shown in the drawings and described herein. The blower 27 of the turbocharger means includes an air inlet 27a and a compressed air discharge outlet 27b.

Air discharge outlet 27b of blower 27 communicates with the combustion chamber 18 of the diesel engine component via the plurality of circumferentially spaced inlet ports 16. In one form of the diesel engine component of the present invention, the inlet ports are provided in a cylinder liner 30 which is of the general configuration shown in FIG. 3. As is well understood by those skilled in the art, liner 30, is receivable within a counter bore formed in the cylinder block of the diesel engine component (not shown in FIG. 1) and includes a plurality of circumferentially spaced apart air inlet ports 16a which are positioned within the engine to receive fresh air from the discharge outlet 27b of the blower 27 of the turbocharger means so that the air will flow into the combustion chamber (see FIG. 3).

With the foregoing general description of the diesel engine component of the invention in mind and by way of general background discussion, the diesel engine itself basically comprises an internal combustion power plant in which the heat of fuel is converted to work in the cylinder of the engine. In operation, air is compressed in the cylinder and then fuel is injected into the cylinder via fuel injection means. Ignition of the fuel is accomplished by the heat of compression.

Figure 2A:
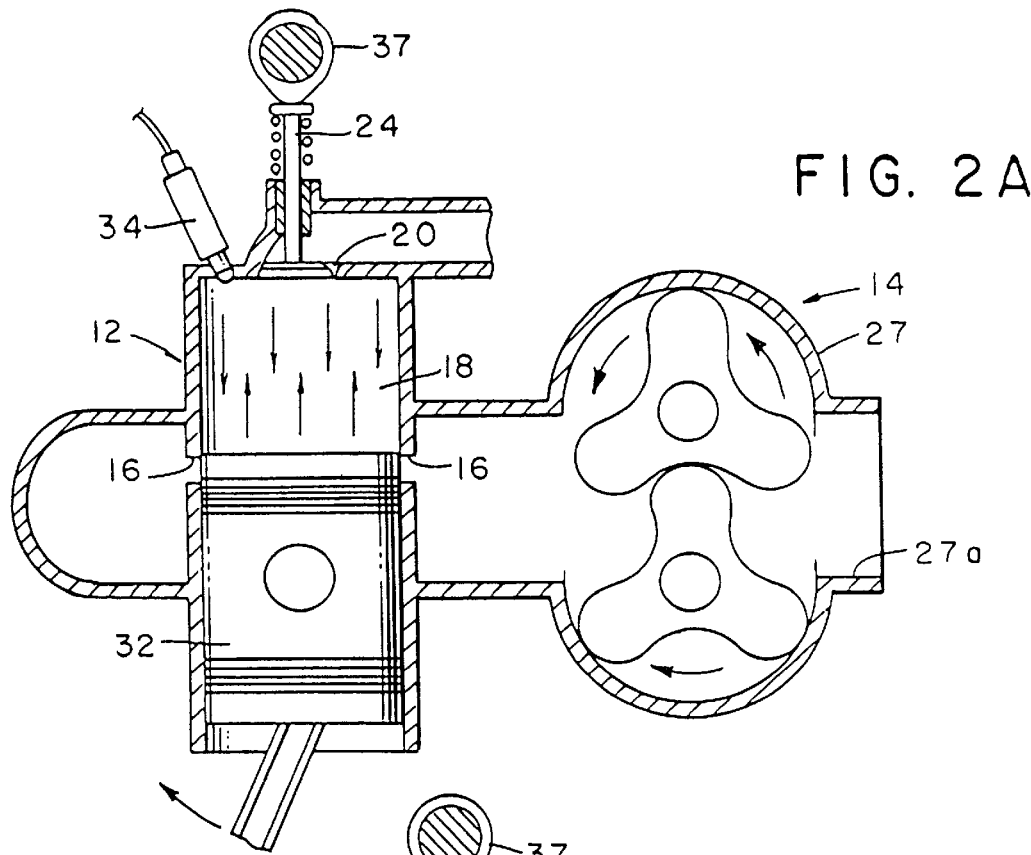
FIG. 2A is a generally diagrammatic view illustrating the compression stroke of the diesel engine component.
Figure 2B:
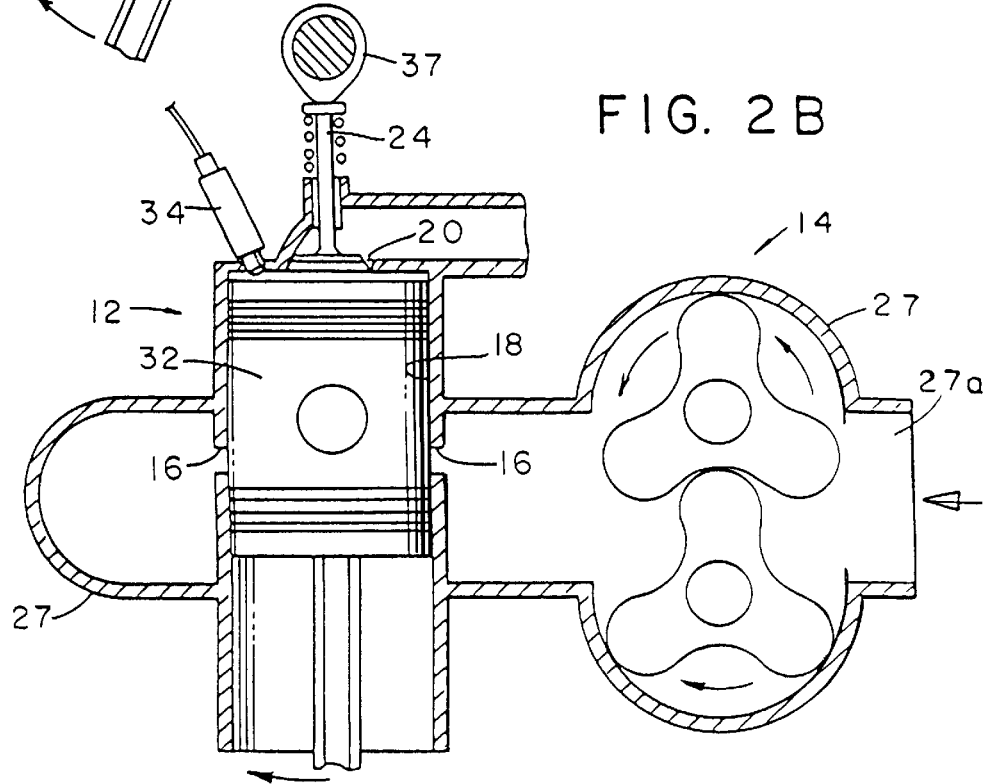
FIG. 2B is a generally diagrammatic view illustrating the power stroke of the diesel engine component.
Figure 2C:
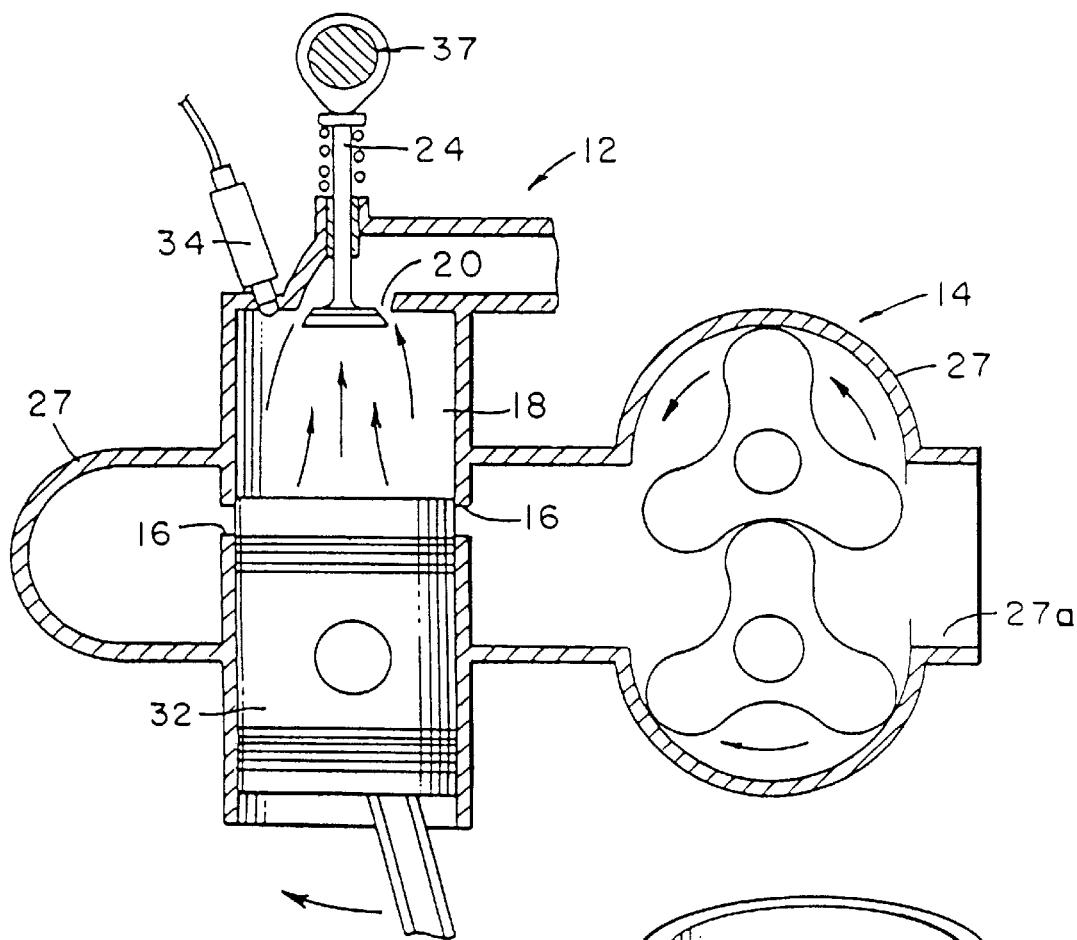
FIG. 2C is a generally diagrammatic view illustrating the exhaust stroke of the diesel engine component.

As illustrated in FIGS. 2A through 2C of the drawings, in the typical two-stroke engine, intake and exhaust take place during the compression and power strokes respectively (FIGS. 2B and 2C).

As a general rule, two-stroke diesel engines are produced in 3, 4 and 6 cylinder models, each of which typically has the same bore and stroke and many of the same working parts such as pistons, connecting rods, cylinder liners and the like. In addition to turbocharger means, the typical two-stroke diesel engine component includes standard accessories, which are not shown in the drawings but, which are well understood by those skilled in the art, such as a water pump, a fuel pump, a fuel filter, an oil cooler, a heat exchanger, a water pump, a radiator and a starting motor. Additionally, pressure lubrication is typically supplied to all main connecting rods and to the various moving parts of the engine.

Turning once again to FIG. 1, in engine operation the unidirectional flow of air in the direction of the arrows of FIG. 1 produces a scavenging effect. In the conventional two-stroke diesel engine component, this scavenging stroke leaves the cylinder substantially full of clean air at the time at which the piston moves to a position where it covers the inlet ports. However, for reasons presently to be discussed, the diesel engine component of the present invention is uniquely modified to deviate from this standard approach and, accordingly, includes a modified scavenge stroke which leaves a substantial volume of exhaust gases in the combustion chamber as the piston moves into the position shown in FIG. 2A.

Referring particularly to FIG. 2A, it is to be observed that continued upward movement of the piston 32 will tend to compress the exhaust gases remaining in the cylinder. At a point in time just prior to the piston reaching its highest position, fuel is injected into the combustion chamber by the fuel injector means, which includes a fuel injector of the general character shown in FIG. 1 and identified by the numeral 34. Injector 34 is generally commercially available and its construction and operation is well known to those skilled in the art. As the fuel is introduced into the combustion chamber, the intense heat generated during the compression cycle ignites the fuel to initiate the power stroke.

Figure 4:
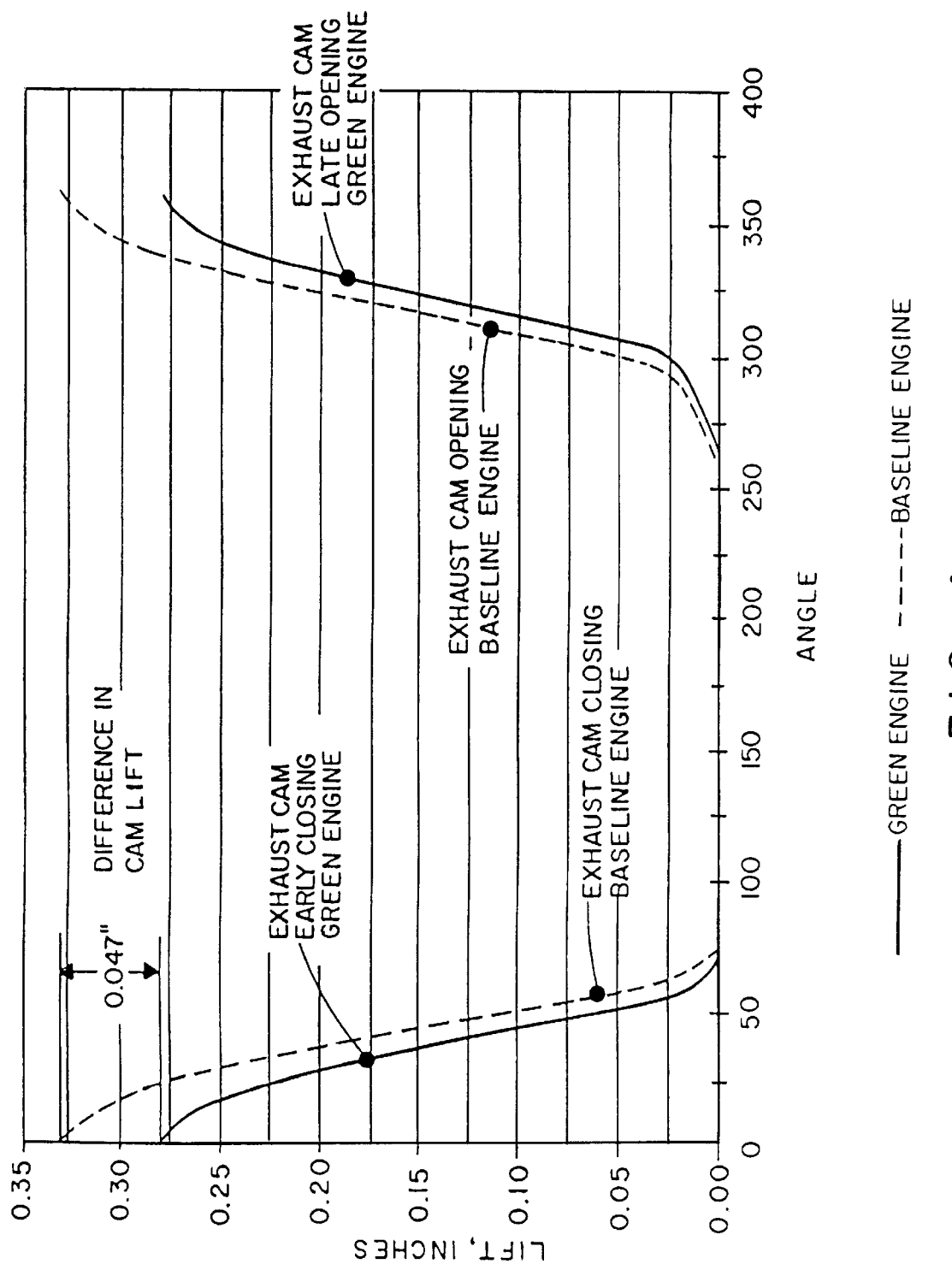
FIG. 4 is a graphical representation illustrating the difference in cam lift timing and cam profile between the diesel engine component of the present invention and the conventional diesel engine component manufactured and sold by the Detroit Diesel Corporation.

The pressure generated by the igniting, combusting and releasing the energy of the fuel forces piston 32 downwardly on its power stroke. As seen in FIG. 2C, when the piston is about half way down, exhaust valve 24 opens to permit the burned gases to escape through exhaust port 20. Shortly thereafter the downwardly moving piston 32 clears inlet ports 16 permitting scavenging air to once again be forced into the cylinder by the blower unit (see FIG. 1). As previously mentioned, the diesel engine component of the power plant of the present invention basically comprises a modification of a conventional two-stroke, commercially available diesel engine. In fact, in one form of the invention, the diesel engine component, comprises a modification of a diesel engine sold by the Detroit Diesel Corporation under the model designation 6V92. The term "baseline engine", as used herein in connection with the first embodiment of the invention, means a standard commercially available first diesel engine of the general character exemplified by the 6V92 engine manufactured and sold by the Detroit Diesel Corporation. As will become clear from the discussion which follows, many of the features of the diesel engine component of the apparatus of the present invention (The Green Engine) are described in terms of changes to the commercially available Detroit Diesel engine. For example, the exhaust cam profile of the Detroit Diesel engine is specifically defined in Table 1 of the specification (see page 10A). While the exhaust cam profile of the diesel engine component of the present invention is specifically defined in Table 2 (see page 10B).Similarly, a comparison between the duration of time during which the exhaust valves are open in the diesel engine component of the present invention and in the Detroit Diesel engine are depicted in FIG. 4 of the drawings.

Perhaps the most astounding difference between the diesel engine component of the present invention (The Green Engine) and that of the first baseline engine relates to the marked reduction in harmful exhaust emissions produced by the Green engine. For example, certain of these differences which have been quantified by an independent testing agency, are set forth in the following table wherein the various emissions are identified in terms of grams per base horsepower-hour:

| Engine | Carbon Monoxide | Emissions in g/bhp-hr. | | |
| --- | --- | --- | --- | --- |
| | | Hydrocarbons | Particulates | Nox |
| Conventional engine | 1.1 | 0.7 | 0.56 | 9.5 |
| Green Engine | 0.9 | 0.5 | 0.13 | 10.6 |
| Green Engine + Catalyst | 0.5 | 0.3 | 0.08 | 10.2 |
| Standards | 15.5 | 1.3 | 0.1 | 10.7 |

With the foregoing considerations in mind, the specific aspects of the improved power plant of the present invention will now be addressed. One extremely important aspect of the invention involves a strategic modification of the exhaust valve cam profile of the diesel engine component. The nature and extent of this modification can be understood by a study of Tables 1 and which define in detail the conventional engine cam profile (Table 1) and the modified or Green Engine cam profile (Table 2). Additionally, reference should be made to FIGS. 2C, 6 and 7 which diagrammatically show one form of camshaft 37 of the invention and illustrate its operational sequence. Basically this modification in cam profile results in the late or more retarded opening of the exhaust valve 24 and the early, or more advanced closing of the exhaust valve (see FIG. 4). As is also noted in FIG. 4, which plots valve lift against crank angle, this change in cam profile causes a net reduction of valve lift "V" of 0.047 inch, that is from about 0.327 inch in the conventional engine to about 0.280 inch in the modified engine (see also FIG. 1). The reduction in valve lift along with the reduction the overall duration of time during which the exhaust valve remains open, as depicted in FIG. 4, causes more residual gases to remain within the cylinder following the scavenge process depicted in FIG. 1. These residual gases, which remain trapped in the cylinder, have a substantial heat absorption capacity that tends to cause a reduction in the peak combustion temperature of the engine. The precise extent of this reduction in temperature in a particular engine, of course, depends on the volume of residual gases remaining in the cylinder, the specific heat of these gases at constant pressure and the difference between the temperature of combustion and the temperature of the residual gases. The present inventor has discovered that the lowered peak combustion temperature achieved through trapping the residual gases within the combustion chamber results in the production of lower nitrogen oxide emissions (NOx) which, in turn, advantageously permits and advance in injection timing while still maintaining NOx emissions that still meet the retrofit rebuild standards. Accordingly, by advancing the injection timing, while at the same time increasing the flow of fresh air into the cylinder through use of a modified turbocharger having a smaller aspect ratio than found in conventional engine component, substantial reductions in particulate matter emissions were achieved. More particularly, in accordance with one form of the method of the present invention, by reducing the turbocharger aspect ratio from about 1.39 to about 1.08 and by strategically advancing the injection timing, which tends to increase the production of NOx, the production of particulate matter is markedly reduced. This result occurs because of the well known trade-off relationship between NOx and production of particulate matter which relationship is graphically illustrated in FIG. 5, which plots particulate emissions against NOx emissions as a function of injection timing. Further, reducing the turbocharger aspect ratio of the turbocharger component causes additional fresh air and therefore additional oxygen to be forced into the combustion chamber. As previously mentioned, this availability of increased oxygen at elevated combustion temperatures leads to a substantial increase in the rate of oxidation of the soluble organic fraction (SOF) which is a major component of particulate matter emissions especially in two-stroke diesel engines. The added charge of air provided by the modified turbocharger component also effectively increases the compression pressure which, in turn, leads to an earlier commencement of combustion because of the combustible mixture reaching its auto ignition temperature at an earlier point in the cycle. This latter phenomenon leads to a more thorough combustion of the fuel and also results in higher exhaust temperature, which, in turn, results in a greater rate of oxidation of SOF and accordingly less particulate matter in the exhaust emissions. To accommodate the increase in compression pressure, piston 32 comprises a modified piston having a compression ratio of about 15:1 as compared with a more conventional piston which has a compression ratio of 17:1.

Referring once again to FIG. 1, associated with the modified fuel injector 34, is a modified injection timing control means which may take the form of a modulator 40. Modulator 40 is operably interconnected with a source of fuel "S" and functions to proportionally introduce the fuel into the combustion chamber according to the level of boost pressure. Modulator 40 is of a character well known to those skilled in the art and can readily be adjusted in the manner presently to be discussed to accomplish the operational results desired.

Figure 5:
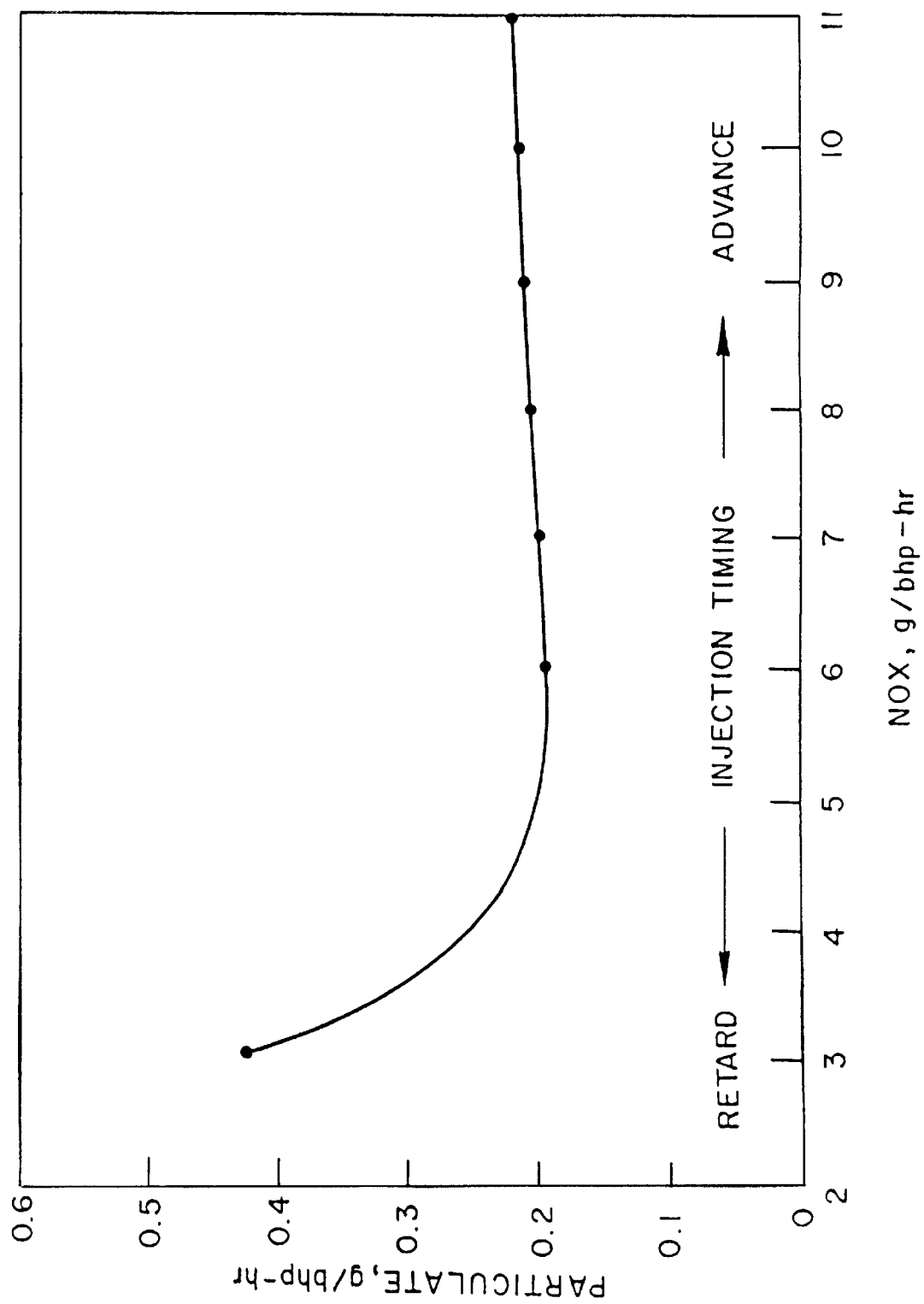
FIG. 5 is a graphical representation, showing for illustrative purposes the trade-off between particulates and nitrogen oxide emissions as a function of injection timing.

In accordance with one form of the method of the present invention, Modulator 40 is adjusted to strategically introduce the fuel according to the boost pressure in a manner to decrease the production of particulate matter while at the same time permitting NOx levels to increase while still remaining within acceptable levels. More particularly, where the conventional timing control means is typically set at approximately 1.475 inch, the timing control means of one form of the apparatus of the invention is adjusted to have a setting of approximately 1.420 inch. In the modified diesel engine component of the invention as described herein, this setting has the effect of increasing in the production of NOx which, as shown in FIG. 5, will cause a concomitant decrease in the production of particulate matter.

It is to be understood that the injection timing control means of the invention can alternatively comprise a throttle delay mechanism having a 0.454 inch setting as compared with the standard mechanism having 0.636 inch setting typically found in a conventional engine. This lower setting better controls the introduction of fuel into the combustion chamber in relation to the intake pressure of the modified diesel engine component of the invention to better achieve the desired results. The throttle control mechanism is also of a character well understood by those skilled in the art and can readily be modified in the manner just described by one skilled in the art.

Referring to FIGS. 8 through 18, another embodiment of the modified engine construction of the invention is there diagrammatically illustrated. Turning particularly to FIG. 8, there is shown a piston and connecting rod of a second baseline engine which was modified in accordance with the method of the present invention to provide an alternate form of modified diesel engine. In this instance the modified engine is a modification of an engine manufactured and sold by Detroit Diesel under the serial number 6VF-118287 (the second baseline engine). This particular engine is also of a character well-known of those skilled in the art and includes a turbocharger component and a diesel engine component. The diesel engine component of this second baseline power plant has a combustion stroke and a scavenge stroke and includes one or more valves for opening and closing exhaust ports provided in the combustion chamber. Additionally this second baseline diesel engine component also has a camshaft for operating the valve, a fuel injector for injecting fuel into the combustion chamber and injection timing control means which typically comprises a cam profile and a set of cams for timing the injection of the fuel into the combustion chamber. The construction and operation of the second baseline engine is well known by those skilled art.

As was the case with the earlier described, first baseline engine, this second baseline engine comprises a compression ignited, two-stroke diesel engine of the type having a compression/combustion stroke. The second baseline engine further includes a combustion cylinder defined by a cylinder having a central axis and a cylinder wall extending generally parallel to the central axis. A plurality of air inlet ports having side walls and an exhaust outlet port are formed in the cylinder wall. Additionally, the second baseline engine includes a piston, which is reciprocally movable within the combustion cylinder and includes a combustion bowl of a first depth and a first diameter formed in the piston crown. A valve is provided for opening and closing the exhaust outlet port and an injector is provided for injecting fuel into the combustion chamber at a first spray angle. As before, the second baseline engine also includes a camshaft rotatable through an angle of 360 degrees for lifting the valve relative to the exhaust port by approximately 0.33 inches, with the camshaft opening the exhaust valve at an angle of about 55 degrees.

The improved power plant of this second embodiment of the invention comprises a modification of the baseline Detroit Diesel engine serial number 6VF118287 and includes a turbocharger means of the character shown in FIG. 1. This turbocharger means comprises a conventional blower and a turbocharger component of the character previously described. The power plant of this second form of the invention operates in basically the same a manner as the modified engine of the first embodiment shown in FIGS. 1 through 8 and as previously described herein.

Prior to modifying the engine, the second baseline Detroit Diesel engine, was extensively tested and emissions from the engine were carefully analyzed. The results of this careful analysis of emissions from the engine revealed that the hydrocarbon emissions were on the order of 0.51 grams per brake horsepower-hour (g/bhp-hr); the carbon monoxide emissions were on the order of 0.88 g/bhp-hr; the nitrogen oxide emissions were on the order of 8.99 g/bhp-hr; and the particulate emissions were about 0.299 g/bhp-hr. As will be discussed in greater detail in the paragraphs which follow, the modified engine of the second form of the invention was also carefully tested and the emissions analyzed in precisely the same manner as was the baseline engine. This testing conclusively established that the modifications made to the second baseline engine in accordance with the method of the second form of the present invention significantly improved the performance of the engine and substantially reduced the harmful emissions produced thereby.

The first step in the method of this latest form of the invention to modify the second baseline engine was to substitute the camshaft thereof with the camshaft previously discussed in connection with be earlier disclosed embodiment of the invention. This camshaft evidences an exhaust valve cam profile of the character previously described herein that essentially reduces the exhaust valve lift by approximately 0.047 inches and also retards the opening of the exhaust valve and advances its closing. As was the case in the earlier described modified engine, these changes effectively reduced the scavenge rate, thus increasing the volume of residual exhaust gases remaining in the cylinder during the compression/combustion/ power stroke. This, in turn, tended to increase compression temperature and consequently tended to increase peak combustion temperature. To offset this effect, the compression ratio was, once again, reduced from its original value of the 17:1 to the value of 15:1. The combination of these two changes to the second baseline engine had the desired beneficial effect of reducing the emission of nitrogen oxides from the engine.

Another important change made to the second baseline engine in accordance with this second method of the invention concerns the substitution of the cylinder liner of the second baseline engine with a cylinder liner having inlet ports of a reduced height of approximately 0.85 inch rather than the cylinder liner of the second baseline engine which had inlet ports having a height of 0.95 inch. During engine operation this change in port height causes the smaller port to be covered sooner by the rising piston which, in turn, causes more residual gases to be trapped inside the cylinder and thus furthers the effect caused by the change in the exhaust camshaft profile. In short, the new camshaft profile coupled with the smaller liner ports caused significantly more residual gases to remain in the cylinder during the compression/combustion/power stroke. This effect combined with the reduced compression ratio resulted in the second modified engine of the invention exhibiting markedly lower nitrogen oxide emissions.

Figure 10:
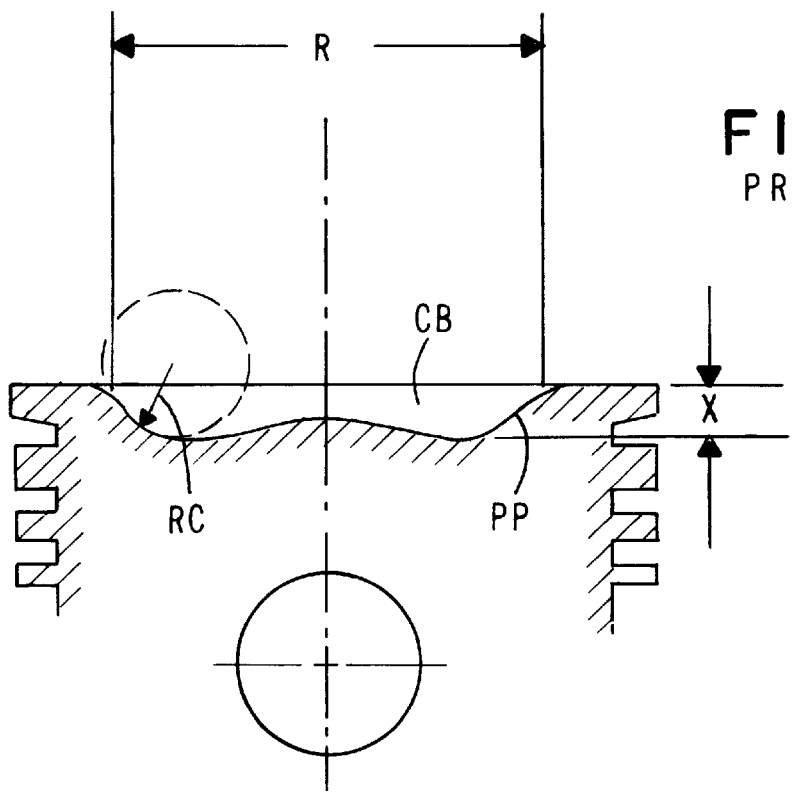
FIG. 10 is a cross-sectional view taken along lines 10—10 of FIG. 8 showing the prior art piston configuration.
Figure 11:
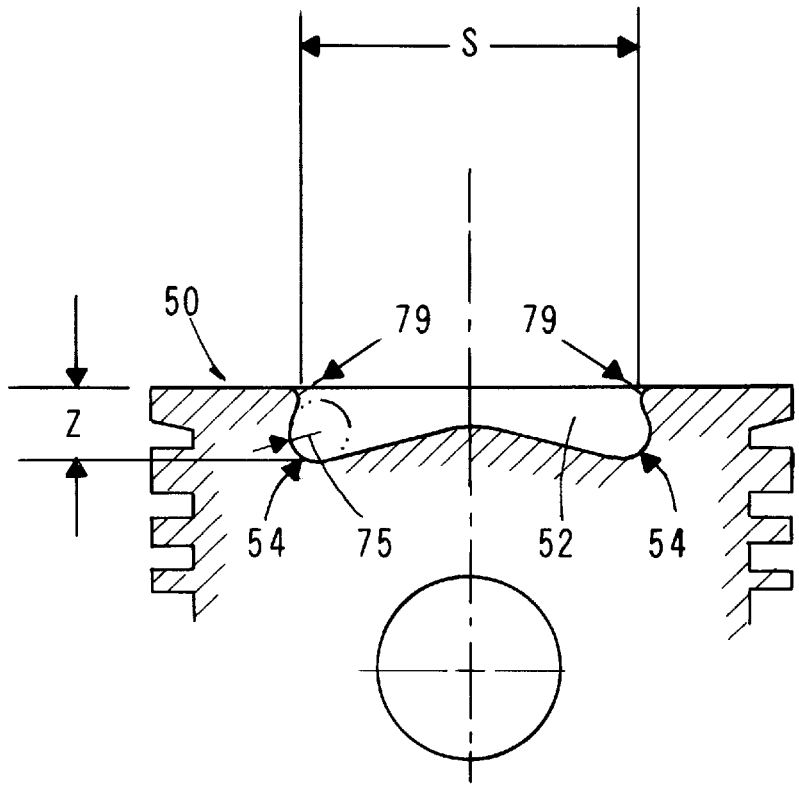
FIG. 11 is a cross-sectional view taken along lines 11—11 of FIG. 9 showing the modified piston configuration.
Figure 12:
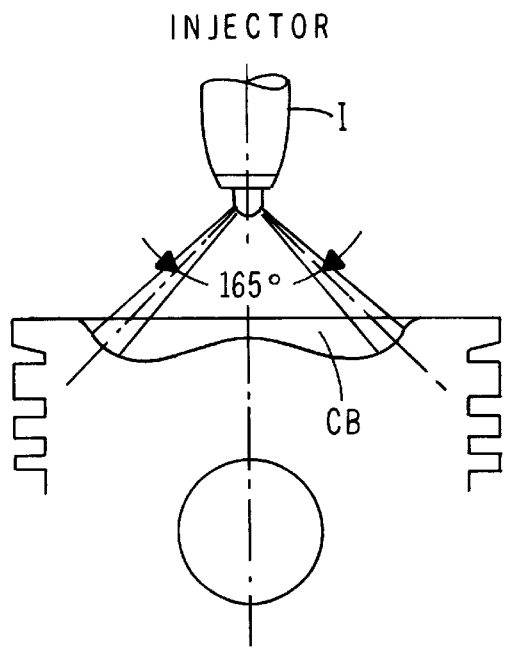
FIG. 12 is a generally diagrammatic view illustrating a prior art form of the injector used with the prior art engine which engine was modified to create the modified engine of the alternate embodiment of the present invention.

Additional changes made to the second Detroit diesel baseline engine in accordance with this latest method of the invention included substantial modifications made to the piston of the engine, the character of which will now be discussed. Turning particularly to FIGS. 8 and 10, the configuration of the second prior art baseline engine piston is there illustrated. By comparing the piston configuration shown in FIGS. 8 and 10 with the piston configuration of the modified engine of this latest form of the invention as shown in FIGS. 9 and 11 it can be seen that substantial changes were made in the configuration of the combustion bowl formed in the piston crown. More particularly, as shown in FIG. 11, the modified piston 50 of the modified engine of this latest embodiment of the invention includes a combustion bowl 52 of a substantially different configuration from that of the prior art piston shown in FIG. 10. For example, the diameter "R" of the combustion bowl "CB" of the prior art piston is substantially larger than the diameter "S" of the combustion bowl 52 of the modified piston shown in FIG. 11. Additionally, the maximum depth X of the prior art combustion bowl is substantially less than the maximum depth Z. of the combustion bowl 52 of the modified 50 piston shown in FIG. 11. Further, the peripheral portion 54 of the combustion bowl of the modified piston is substantially more rounded than the peripheral portion "PP" of the combustion bowl of the prior art piston.

Figure 13:
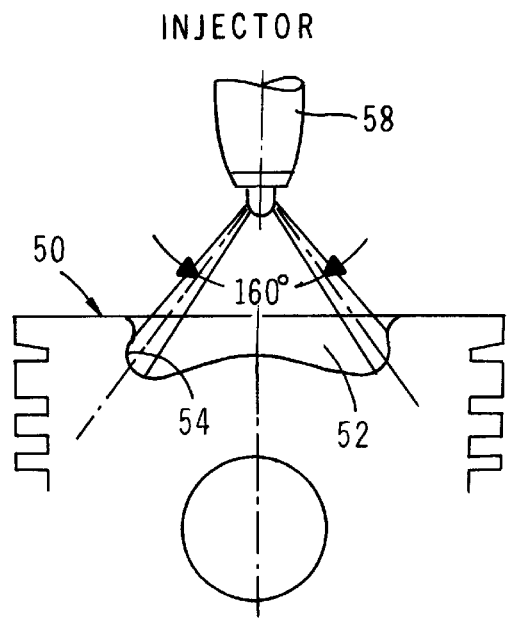
FIG. 13 is a diagrammatic view illustrating an alternate form of injector used in connection with the modified piston of the modified engine of the alternate form of the present invention.
Figure 14:
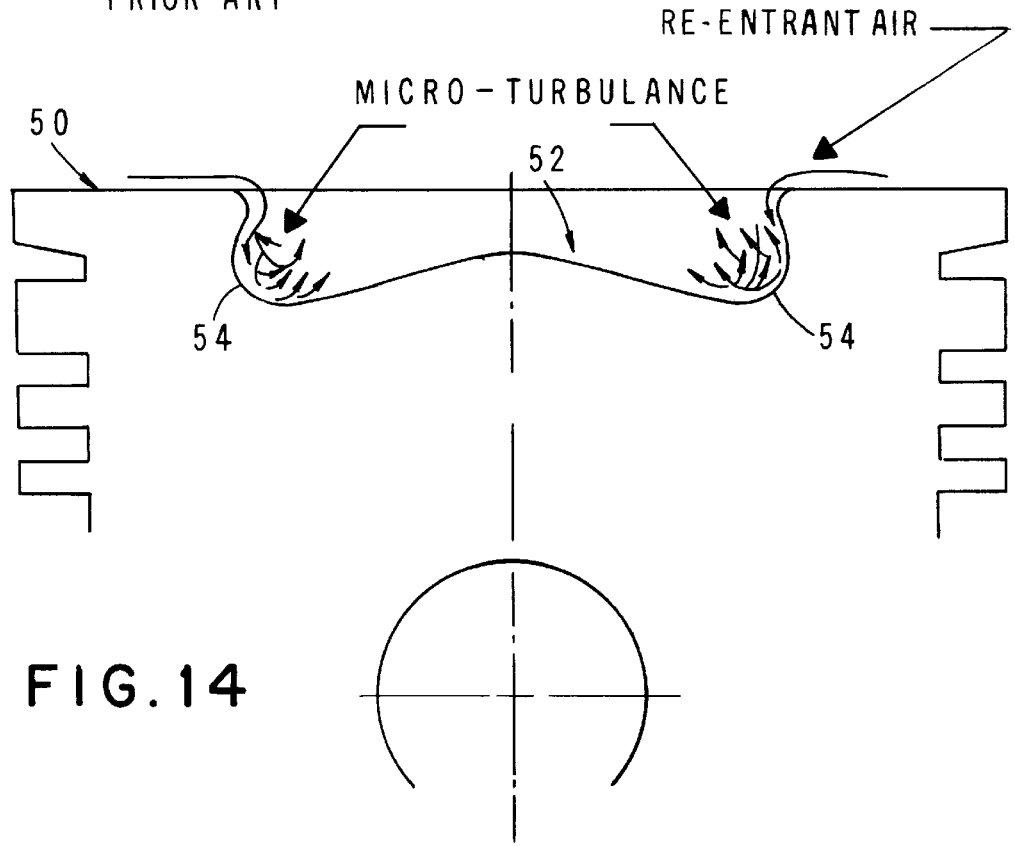
FIG. 14 is an enlarged diagrammatic view illustrating the effect of the modified piston of the present invention on a re-entrant air introduced into the engine.

Referring also to FIG. 14, it is to be observed that the rounder and deeper peripheral portion 54 of the combustion bowl of the modified piton tends to create an entirely different and vastly improved flow pattern of the a re-entrant air entering the piston bowl. More particularly, due to the unique configuration of the combustion bowl 52 of the modified piston, substantial microturbulence occurs within of the combustion bowl as the re-entrant air enters the peripheral portion of the combustion bowl in the manner illustrated in FIG. 14. As will be discussed in greater detail in the paragraphs with follow, this smaller diameter, deeper and more rounded peripheral portion functions to cause more efficient combustion of the fuel introduced into the combustion chamber by the engine injector 58 (FIG. 13).

Because of the change in the configuration of the combustion bowl of the modified piston as described in the preceding paragraphs, a change in the injector spray angle of the injector is necessary in order to optimize the spray pattern and maximize the benefit of charge mixing by spraying the fuel more efficiently over the uniquely formed combustion bowl 52 of the modified piston. More particularly by referring to FIGS. 12 and 13 it can be seen that the injector "I" of the prior art baseline engine provides a spray angle of about 165 degrees. However, as shown in FIG. 13, in order to accommodate the smaller diameter combustion bowl 52 of the modified piston 50, the spray angle of the modified injector 58 is reduced to an angle of approximately 160 degrees. The optimized spray angle of the modified injector 58 of the second modified engine of the present invention also functions to encourage evaporation and, at the same time, facilitates the mixing of the fuel and air through assistance from the micro-turbulent flow of the re-entrant air into the combustion chamber as illustrated in FIG. 14.

Figure 3:
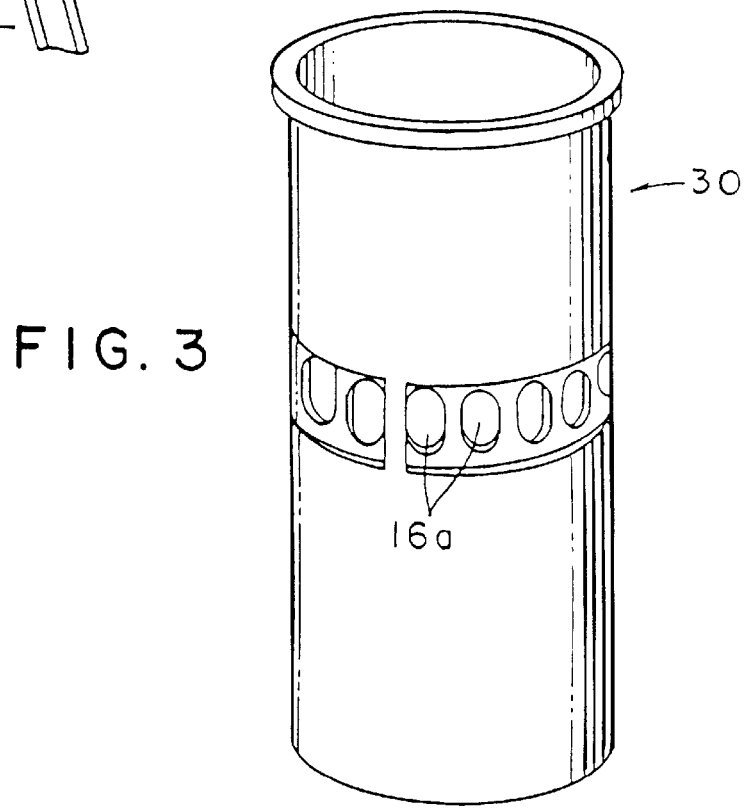
FIG. 3 is a generally perspective view of one form of modified cylinder liner of the diesel engine component.
Figure 15:
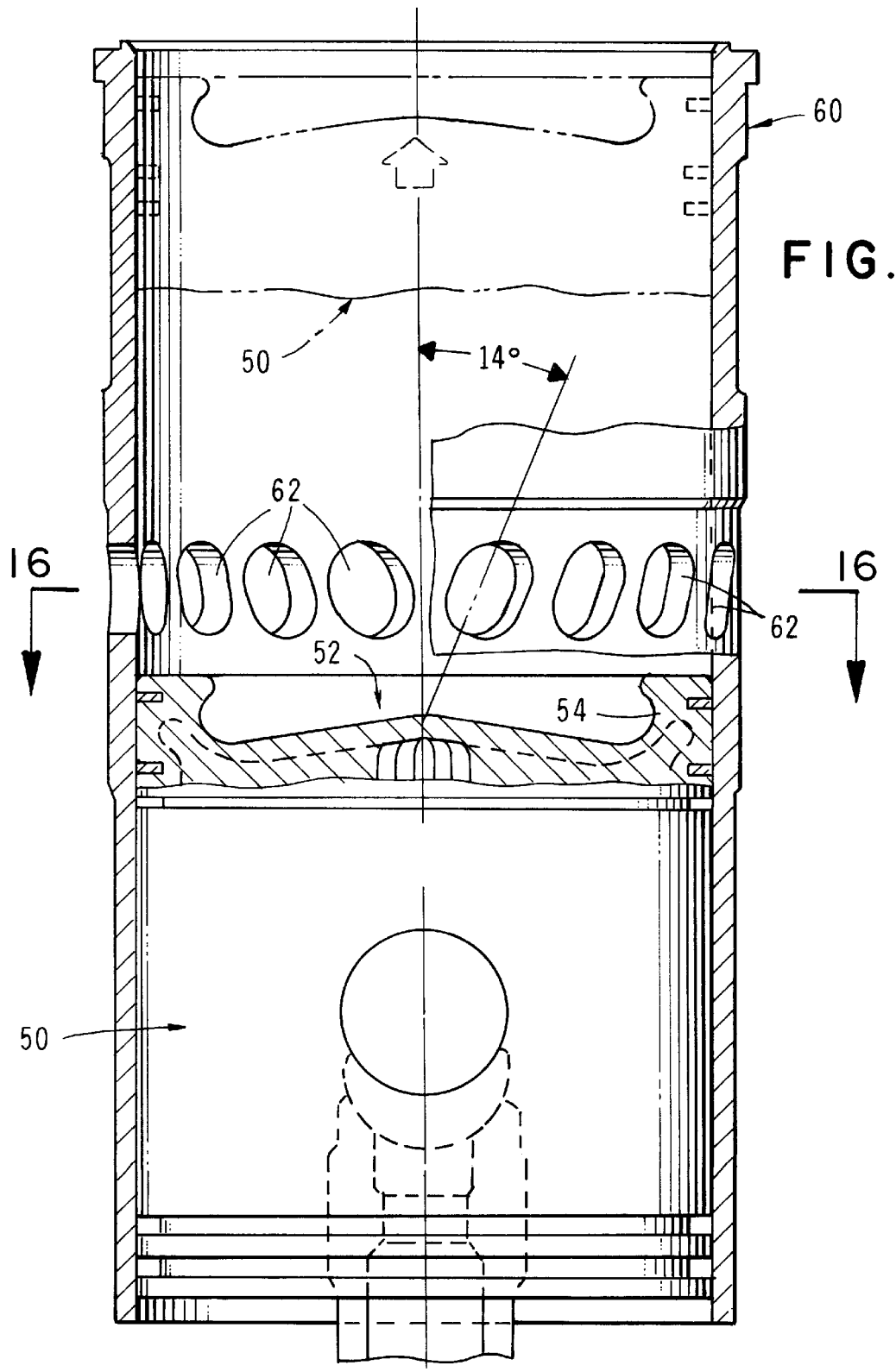
FIG. 15 is a cross-sectional view of one form of modified cylinder liner of the modified engine of the present invention.
Figure 16:
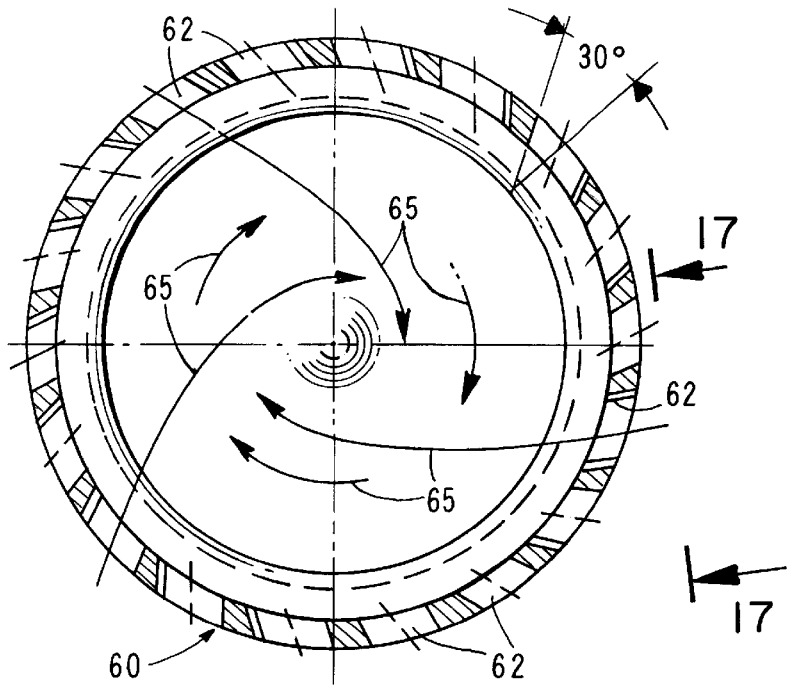
FIG. 16 is a cross-sectional view taken along lines 16—16 of FIG. 15 illustrating the flow pattern of gases entering the combustion chamber.
Figure 17:
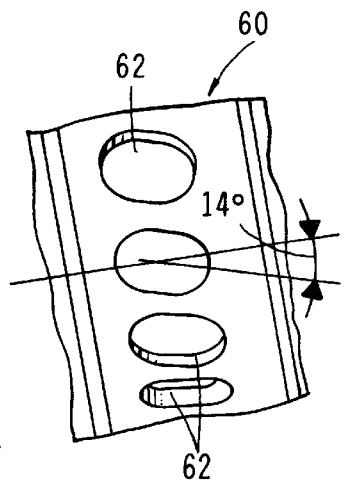
FIG. 17 is of view taken along lines 17—17 of FIG. 16.

As earlier discussed in connection with the embodiment of the invention illustrated in FIGS. 1 through 8, the air charging and scavenging processes are significantly impacted by change in the design of the inlet ports of the cylinder liner (see for example FIG. 3). In accordance with this latest method of the invention, the cylinder liner was further modified to provide a modified cylinder liner 60 having inlet ports 62 of the same size, namely about 0.85 inches in height, but uniquely skewed to the right from vertical by approximately 14 degrees (see FIG. 15). This change was combined with a change in the tangential inclination of the ports to provide a modified tangential inclination of approximately 30 degrees as illustrated in FIGS. 15,16 and 17. These changes in the cylinder liner port configuration function to optimize the flow pattern of gases flowing through the cylinder by creating a novel swirl type motion of the character depicted by the arrows 65 of FIG. 16. This swirl motion markedly improves scavenging and therefore, reduces particulate matter emissions and also reduces fuel consumption.

Figure 18:
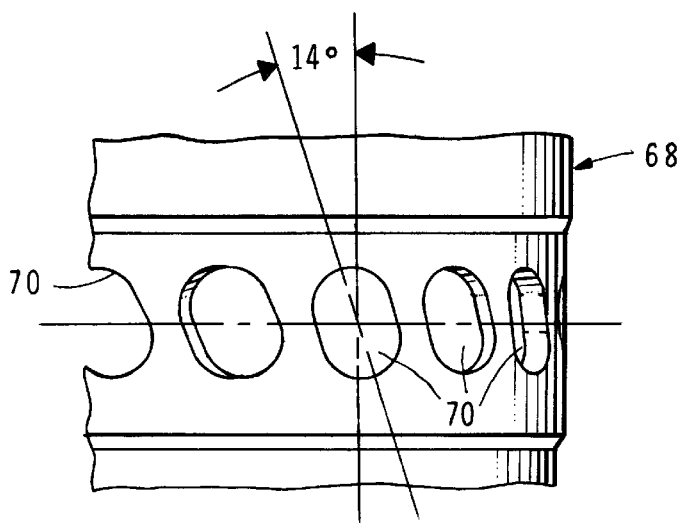
FIG. 18 is a fragmentary view similar to FIG. 17, but showing still another form of cylinder liner of the modified engine of the present invention having still differently configured inlet ports.

Turning to FIG. 18, still another form of the modified cylinder liner of the engine of the present invention is there illustrated. This cylinder liner, which is generally designated by the numeral 68, is similar and many respects to the modified cylinder liner 60 illustrated and FIGS. 15,16 and 17. However as indicated in FIG. 18 the ports 70 of modified liner 68 are skewed to the left rather than to the right, but otherwise have the same general configuration has the ports of modified cylinder liner 60. This configuration of the liner, of course, produces a novel swirl type motion in the opposite direction and also improves scavenging and reduces particulate matter emissions.

By way of summary, the method of this latest form of the invention comprises the steps of modifying the camshaft, the cylinder liner, the injector and also improves scavenging and reduces particulate matter emissions and the combustion bowl of the second piston of the baseline compression ignited two-stroke engine. This camshaft modification causes opening and closing of the exhaust valve in a manner to allow, after the combustion stroke, a buildup of exhaust gases within the cylinder in a quantity sufficient to absorb combustion heat to an extent to limit the combustion temperature to a temperature that will limit the formation of nitrogen oxide to a degree that, following the combustion stroke, the exhaust gases formed will contain nitrogen oxide in an amount less than about 6.0 g/bhp-hr. and to limit the formation of particulate matter within the combustion gases to an amount less than about 0.1 g/bhp-hr. Additionally, in accordance with the method of this latest form of the invention, the camshaft is modified in a manner to limit opening of the exhaust valve following the combustion stroke to a distance no greater than about 0.28 inches.

The modification of the cylinder sleeve of the second baseline engine involves modifications to the inlet ports of the cylinder liner to reduce the height of the ports and also to markedly skew them at an angle relative to the central axis of the cylinder of between about 12 and 16 degrees. Additionally, the method of this latest form of the invention also includes the step of tangentially inclining the walls of the inlet ports formed in the cylinder sleeve.

The third important aspect of the method of this latest form of the invention comprises the modification of the combustion bowl of the piston of the second baseline engine. This modification involves reducing the diameter of the combustion bowl of the second baseline engine and also changing its shape to provide a peripheral portion having walls exhibiting a radius of curvature 75 (FIG. 11) substantially less than the radius of curvature "RC" of the peripheral portion of the combustion bowl "CB" of the baseline engine (FIG. 10). More particularly, the peripheral portion 54 of the combustion bowl of the modified piston is generally semi-toroidal with the entrance to the combustion bowl defining an inturned, squish-like lip 79. As previously mentioned and as is illustrated in FIG. 14, this novel shape of the peripheral portion of the combustion chamber of the piston of the modified engine functions to increase micro-turbulence within the combustion bowl in the manner illustrated by the arrows in FIG. 14.

Still another important aspect of this latest form of the method of the invention includes the step of modifying the injector so as to inject fuel into the combustion chamber at a rate and in a spray pattern designed to maximize the benefit of charge mixing by spraying the fuel over a larger hot surface area of the combustion bowl. This action, in turn, encourages full evaporation of the fuel and facilitates mixing of the fuel with air as a result of the micro-turbulent motion of the re-entrant air as it flows into the combustion bowl As previously mentioned, following the modification of the second baseline engine, the modified engine was carefully tested in the same manner as the prior art baseline engine. This comprehensive testing of the modified engine revealed that marked improvements had been achieved. For example, the hydrocarbon emissions were on the order of 0.35 g/bhp-hr.; carbon monoxide emissions were on the order of 0.49 g/bhp-hr.; the nitrogen oxide emissions were reduced to approximately 5.39 g/bhp-hr.; and particulate emissions were reduced to approximately 0.097 g/bhp-hr. When the foregoing results are compared with the results from testing of the original baseline, unmodified engine, it is at once apparent that the modified engine of this latest form of the invention represents a significant improvement over the baseline engine and has the net effect of substantially reducing harmful emissions, substantially reducing acceleration smoke and at the same time markedly improving fuel economy.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

What is claimed is:

1. A method of making an improved low emission mechanical power plant by modifying a baseline, compression ignited, two stroke diesel engine of the type having a compression/combustion stroke and including a combustion cylinder defined by a cylinder liner having a central axis and a plurality of air inlet ports having side walls, said combustion cylinder having an exhaust outlet port; a piston reciprocally movable within the combustion cylinder, said piston having a combustion bowl of a first diameter; a valve for opening and closing the exhaust outlet port; and injector for injecting fuel into the combustion chamber at a first spray angle; and a camshaft rotatable through an angle of 360 degrees for lifting the valve relative to the exhaust port, the method comprising the steps of:

(a) modifying the camshaft of the baseline compression ignited, two stroke diesel engine to cause opening and closing of the exhaust valve in a manner to allow, after said combustion stroke, a buildup of exhaust gases within said cylinder in a quantity sufficient to absorb combustion heat to an extent to limit the combustion temperature to a temperature that will limit the formation of nitrogen oxide to a degree that, following the combustion stroke, the exhaust gases formed will contain nitrogen oxide an amount less than 6.0 grams per brake horsepower-hour; and (b) modifying the cylinder liner and the combustion bowl of the piston of the baseline compression ignited, two-stroke engine in a manner to limit the formation of particulate matter within the combustion gases to an amount less than about 0.1 grams per brake horsepower-hour.

2. A method as defined in claim 1 including the step of opening the exhaust valve following the combustion stroke by a distance no greater than about 0.28 inches.

3. A method as defined in claim 1 in which modifying the cylinder liner includes the step of modifying the air inlet ports of the cylinder liner by skewing the inlet ports at an acute angle relative to the central axis of the cylinder liner.

4. A method as defined in claim 3, in which modifying the cylinder liner includes the further step of tangentially inclining the walls of the inlet ports.

5. A method as defined in claim 3 in which modifying the cylinder liner includes the step of skewing the inlet ports at an acute angle of between about 12 and 16 degrees.

6. A method as defined in claim 3 in which modifying the combustion bowl of the piston includes the step of providing a combustion bowl having a second diameter less than the first diameter of the piston of the baseline engine and having a configuration which results in an increase in turbulence of gases introduced into the combustion bowl.

7. A method as defined in claim 6 including the further step of modifying the injector of the base line to provide an injector having a second spray angle less than the first spray angle of the injector of the baseline engine.

8. A method as defined in claim 7 in which modifying the baseline engine produces a power plant in which the exhaust gases formed thereby will contain hydrocarbon emissions less than 0.40 g/bhp-hr.

9. A method as defined in claim 8 in which modifying the baseline engine produces a power plant in which the exhaust gases formed thereby will contain carbon monoxide less than 0.50 g/bhp-hr.

10. A method of making an improved low emission mechanical power plant by modifying a baseline, compression ignited, two stroke diesel engine of the type having a compression/combustion stroke and including a combustion cylinder defined by a cylinder having a central axis and a plurality of air inlet ports having side walls and an exhaust outlet port; a piston reciprocally movable within the combustion cylinder, said piston having a combustion bowl of a first diameter; a valve for opening and closing the exhaust outlet port; and injector for injecting fuel into the combustion chamber at a first spray angle; and a camshaft rotatable through an angle of 360 degrees for lifting the valve relative to the exhaust port, the method comprising the steps of:

(a) modifying the camshaft of the baseline compression ignited, two stroke diesel engine to cause opening and closing of the exhaust valve in a manner to allow, after said combustion stroke, a buildup of exhaust gases within said cylinder in a quantity sufficient to absorb combustion heat to an extent to limit the combustion temperature to a temperature that will limit the formation of nitrogen oxide to a degree that, following the combustion stroke, the exhaust gases formed will contain nitrogen oxide an amount less than 6.0 grams per brake horsepower-hour and to limit the formation of particulate matter within the combustion gases to an amount less than about 0.1 grams per brake horsepower-hour;

(b) modifying the air inlet ports of the cylinder sleeve by skewing the inlet ports thereof at an acute angle relative to the central axis of the cylinder sleeve and by tangentially inclining the walls of the inlet ports; and (c) modifying the combustion bowl of the piston of the baseline engine to reduce the diameter thereof and to change the configuration thereof to provide a rounded peripheral portion tending to create micro-turbulence within gases introduced into the combustion bowl.

11. A method as defined in claim 10 in which the inlet ports are skewed at an acute angle of between about 12 and 16 degrees.

12. A method as defined in claim 10 including the step of opening the exhaust valve following the combustion stroke by a distance no greater than about 0.28 inches.

13. A method as defined in claim 10 including the further step of modifying the injector or by providing an injector having a second spray angle less than the first spray angle.

14. In a two stroke, compression-ignited engine having a compression/combustion stroke, a cylinder defining a combustion chamber, a rotating crankshaft and an exhaust valve movable between an open and a closed position for exhausting exhaust gases from the combustion chamber, the improvement comprising:

(a) a cylinder liner disposed within said combustion chamber, said cylinder liner having a central axis and a cylinder wall extending substantially parallel to said cylinder wall, said cylinder wall having a plurality of inlet ports skewed at an acute angle with respect to said central axis; said inlet ports having tangentially inclined walls; and (b) camshaft operably associated with said crankshaft and with said exhaust valve for controllably moving said exhaust valve between said open and closed position in a manner to allow a buildup of exhaust gases within the combustion chamber sufficient to absorb combustion heat to an extent necessary to adequately control peak combustion temperature to a temperature that will minimize the formation of nitrogen oxide so that following said combustion stroke the quantity of nitrogen oxide contained within the exhaust gases exhausted from the combustion cylinder will be less than about 6.0 g/bhp-hr. while at the same time the particulate matter contained within the exhaust gases will be less than about 0.1 g/bhp-hr.

15. A method of making an improved low emission mechanical power plant by modifying a baseline, compression ignited, two stroke diesel engine of the type having a compression/combustion stroke and including a combustion cylinder defined by a cylinder having a central axis and a plurality of air inlet ports having side walls and an exhaust outlet port; a piston reciprocally movable within the combustion cylinder, said piston having a combustion bowl of a first diameter; a valve for opening and closing the exhaust outlet port; and injector for injecting fuel into the combustion chamber at a first spray angle; and a camshaft rotatable through an angle of 360 degrees for lifting the valve relative to the exhaust port, the method comprising the steps of:

(a) modifying the camshaft of the baseline compression ignited, two-stroke diesel engine to cause opening and closing of the exhaust valve in a manner to allow, after said combustion stroke, a buildup of exhaust gases within said cylinder in a quantity sufficient to absorb combustion heat to an extent to limit the combustion temperature to a temperature that will limit the formation of nitrogen oxide to a degree that, following the combustion stroke, the exhaust gases formed will contain nitrogen oxide in an amount less than 6.0 g/bhp-hr. and to limit the formation of particulate matter within the combustion gases to an amount less than about 0.1 g/bhp-hr.;

(b) modifying the air inlet ports of the cylinder sleeve by skewing the inlet ports thereof at an acute angle relative to the central axis of the cylinder sleeve and by tangentially inclining the walls of the inlet ports; and (c) modifying the combustion bowl of the baseline engine to have a second diameter less than the first diameter and to have a peripheral portion tending to create micro-turbulence within gases introduced therein.

16. In a two-stroke compression ignited engine as defined in claim 14 in which said inlet ports of said cylinder liner are skewed at an angle of between 12 and 16 degrees.

17. In a two-stroke, compression-ignited engine as defined in claim 14 in which the camshaft opens the exhaust valve by a lift amount of approximately 0.28 inches.

18. In a two-stroke, compression-ignited engine as defined in claim 15 in which the improvement further comprises providing a piston for reciprocal movement within said combustion chamber, said piston including a combustion bowl having a rounded, semi-toroidal shaped peripheral portion.

19. In a two-stroke, compression-ignited engine as defined in claim 18 in which the improvement further comprises providing a fuel injector for injecting fuel into said combustion bowl at a spray angle of approximately 160 degrees.

20. In a two-stroke, compression-ignited engine as defined in claim 19 in which said fuel injector sprays fuel directly into said rounded, semi-toroidal shaped peripheral portion of said combustion bowl.

* * * * *